United States Patent [19]

Donnelly

[11] 4,223,576

[45] Sep. 23, 1980

[54] APPARATUS AND METHOD FOR LATHE CUTOFF AND CHAMFER

[75] Inventor: James E. Donnelly, Gastonia, N.C.

[73] Assignee: Spin-O-Magic, Inc., Gastonia, N.C.

[21] Appl. No.: 948,825

[22] Filed: Oct. 5, 1978

[51] Int. Cl.³ .................. B23B 1/00; B23B 29/26
[52] U.S. Cl. .................................. 82/1 C; 82/25; 82/47; 407/69; 407/117
[58] Field of Search .............. 82/25, 1 C, 36 R, 47; 407/67, 69, 117

[56] References Cited

U.S. PATENT DOCUMENTS

| | | | |
|---|---|---|---|
| 1,857,208 | 5/1932 | Metz | 82/25 |
| 1,963,023 | 6/1934 | Libby | 82/25 |
| 2,156,354 | 5/1939 | Rozmarich | 82/25 |
| 2,399,315 | 4/1946 | Beird | 82/25 |
| 3,654,827 | 4/1972 | Lemanski | 407/67 X |

*Primary Examiner*—Leonidas Vlachos
*Attorney, Agent, or Firm*—Richards, Shefte & Pinckney

[57] ABSTRACT

A tool holder is provided for the cross slide of a lathe. A cutoff tool extends horizontally from the holder toward the rotational axis of a workpiece in the lathe, and a chamfering tool extends vertically downwardly from the holder in a common cutting plane with the cutoff tool. As the cutoff tool is advanced radially into the workpiece to cut a portion off the end thereof, the chamfering tool is thereby moved chordally with respect to the peripheral edges of the annular groove being formed in the workpiece by the cutoff tool. The cutting edges of the chamfering tool are preferably spaced from the cutoff tool such that they engage the groove edges during the cutting of the groove and complete the chamfering thereof prior to completion of cutoff.

9 Claims, 3 Drawing Figures

APPARATUS AND METHOD FOR LATHE CUTOFF AND CHAMFER

BACKGROUND OF THE INVENTION

Metal working operations performed on a round metal bar are commonly carried out through the use of a lathe and cutting tools associated therewith. The bar is gripped by the collet chuck of the lathe to extend therefrom, and the bar is rotated about its axis while various cutting tools are serially applied to the rotating extending end of the bar to perform multiple cutting operations on the bar, such cutting tools being carried in a cross slide square turret or the like in a manner which permits the plurality of tools to be separately and selectively disposed at a cutting disposition with respect to the rotating bar. The last operation performed is commonly that of cutting off the extending end portion of the workpiece which has been lathe-cut in the previous operations to a desirable shape, and such cutting off is commonly done with a narrow cutting tool having a straight cutting edge which is advanced radially into the workpiece, cutting an annular groove therein until the remaining metal beneath the groove becomes so weak that the extending end portion beyond the groove breaks off from the chucked main body of the round bar or workpiece.

Since tool locations on the conventional cross slide square turret of a lathe are limited in number, the cutoff tool is sometimes mounted on the rear end of the cross slide at the back of the lathe to cut upside-down as compared with other tools mounted in the cross slide turret. Since it is desirable in many cases to chamfer or bevel the sharp peripheral edges of the cutoff portion, such chamfering may be done by a separate chamfering tool which cuts a V-groove of suitable depth in the workpiece at the cutoff location prior to cutting off, or alternatively, the cutting off might be stopped part way through the workpiece while the edges are chamfered with a separate tool. In all the above cases, valuable lathe time and labor is used by performing the chamfering as a separate operation from the cutting off.

By substantial contrast, the tool holder of the present invention permits the chamfering operation to be accomplished simultaneously with the cutting off, thereby saving lathe time, as well as eliminating the possibility of accidental omission of the chamfering operation, as sometimes happens when a lathe operator is depended upon to chamfer as a separate operation.

SUMMARY OF THE INVENTION

The present invention provides a tool holder for a lathe having a rotating spindle arranged to turn a workpiece extending therefrom about the rotational axis thereof. The tool holder has a mounting portion adapted to be mounted on the cross slide of the lathe for movement therewith transverse to the rotational axis, and has a support portion having cutoff tool means mounted thereon to extend therefrom and having chamfering tool means mounted thereon to extend therefrom in a common plane with said cutoff tool to present at least one chamferer cutting edge spaced from a cutting edge presented at the extending end of the cutoff tool. The chamfering tool tracks the cutoff tool when the tool holder is disposed with their common plane perpendicular to the rotational axis of the workpiece, whereby the workpiece can be simultaneously cut off and chamfered.

In the preferred embodiment of the present invention, the cutoff tool is disposed on the tool holder for substantially radial movement with respect to the rotational axis of the workpiece for the cutting off, and the chamfering tool is disposed and arranged on the holder for substantially chordal movement with respect to a peripheral edge of the workpiece formed by the cutoff tool in order to chamfer that edge. The aforesaid radial and chordal movements are simultaneously derived from the transverse movement of the cross slide, whereby the chamfering and cutting off are performed simultaneously.

Preferably, the cutting edge of the cutoff tool of the present invention is straight and has a predetermined width, and the chamfering tool extends from the support portion of the tool holder in a direction substantially perpendicular to the extent of the cutoff tool and has at least one chamferer edge extending outwardly beyond a plane which is parallel to the aforesaid common plane and which passes through one end of the straight cutting edge.

In the preferred embodiment of the present invention, the cutoff tool cuts an annular groove in the workpiece, and the chamfering tool has two chamferer edges, each such chamferer edge extending outwardly beyond a plane which is parallel to the common plane and which passes through one of the two ends of the straight cutting edge of the cutoff tool respectively, whereby said chamfering tool is arranged to chamfer both peripheral edges of the groove cut by the cutoff tool. It is preferred that the respective dispositions of the chamfering tool and cutoff tool be such that the chamfering is completed prior to the completion of cutting off.

The method of the present invention for cutting off and chamfering a workpiece as it is turned in a lathe includes the steps of securing a workpiece to the spindle of the lathe for rotation therewith, rotating the workpiece for performance of cutting operations thereof, securing a cutoff tool and a chamfering tool to a cross-slide of the lathe, moving the cutoff tool by means of the cross-slide substantially radially with respect to the axis of rotation of the workpiece and into cutting engagement with the workpiece to cut an annular groove therein, moving the chamfering tool substantially chordally with respect to the peripheral edges of the workpiece adjacent the groove simultaneously and commonly with the cutoff tool movement and into chamfer cutting engagement with at least one of the edges formed by the annular groove, and thereafter continuing the radial cutoff tool movement for completion of the cutting off of the workpiece.

In the preferred method of the present invention, chordal movement of the chamfering tool is continued by the continuing cutoff tool movement for completion of the chamfering of the workpiece prior to the completion of the cutting off.

DESCRIPTION OF THE PREFERRED EMBODIMENTS

Figure 1:
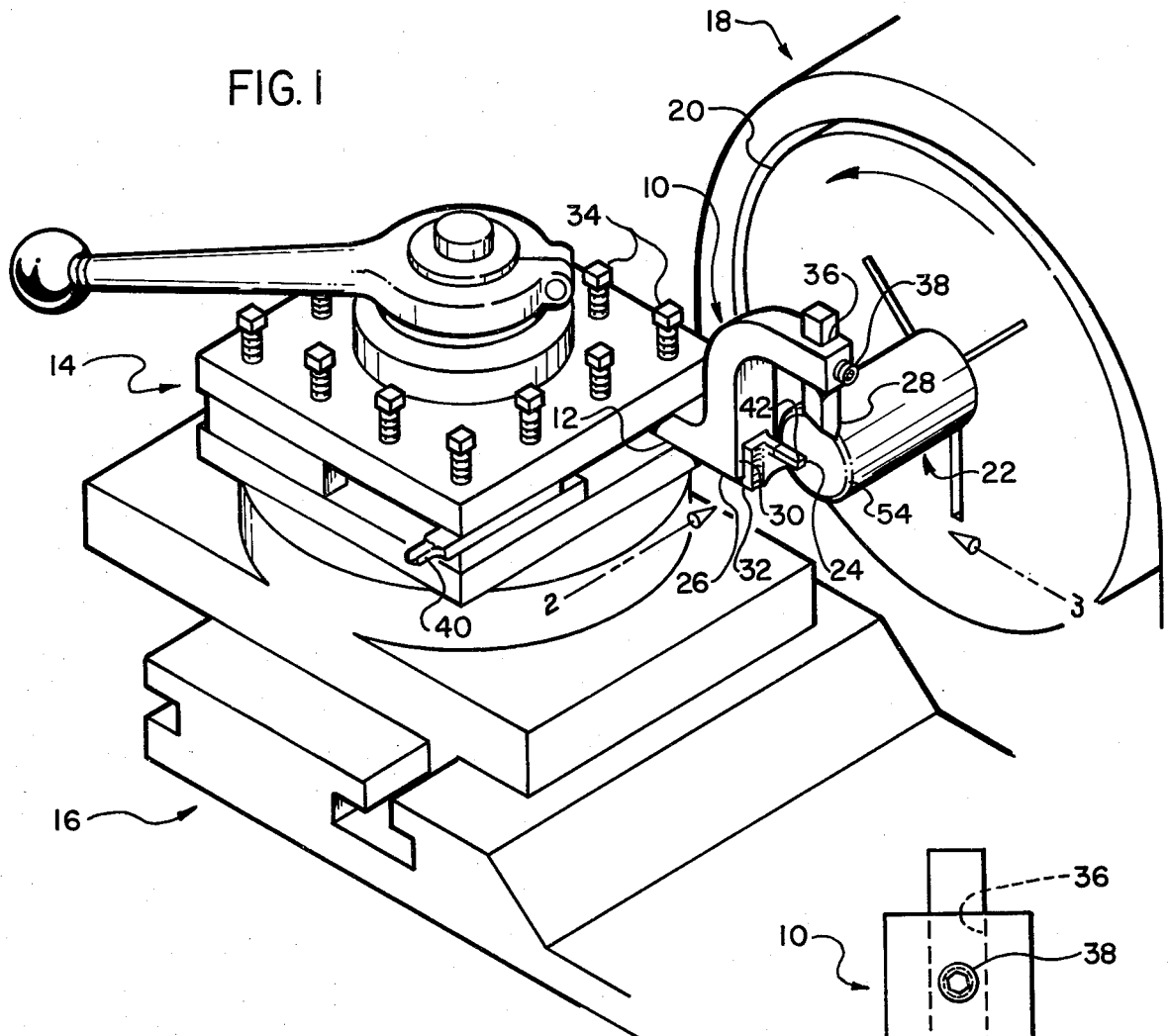
FIG. 1 is a perspective view of a tool holder according to the present invention shown mounted on the square turret on the cross slide of a lathe, a cut off and chamfer operation having been completed on a workpiece mounted in the collet chuck of the lathe.

The present invention provides a tool holder adapted for mounting on the cross slide of a lathe to hold cutoff and chamfering tools for simultaneously cutting off and chamfering the cutoff edges of a workpiece mounted in the chuck of the lathe for turning about a rotational axis. As shown in FIG. 1, the tool holder 10 has a mounting portion 12 adapted for convenient mounting in a conventional square turret 14 carried on the cross slide 16 of a lathe 18 having a collet chuck 20. The collet chuck 20 is arranged on a rotating spindle (not shown) to grip and turn a workpiece 22, such as a round bar or rod, about the rotational axis of the spindle and the workpiece while lathe-turning operations are performed thereon.

The tool holder 10 has a cutoff cutting tool 24 mounted to extend horizontally from a support portion 26 of the holder, and has a chamfering cutting tool 28 mounted on the support portion 26 to extend vertically therefrom toward the cutoff tool and perpendicularly with respect to the extent thereof. A rectangular slot 30 extends through the support portion 26 and the mounting portion 12 and slidably carries therein the rectangular shank 32 of the cutoff tool 24 as a convenient means of adjustably disposing the cutoff tool 24 on the holder 10 and locking the tool 24 to the support portion 26 and the mounting portion 12 when the clamp screws 34 of the square turret 14 are tightened down on the upper side of the mounting portion 12. The depth of the shank 32 is greater than that of the slot 30, so that the shank, the mounting portion 12, the support portion 26, and the square turret 14 are squeezed tightly together in fixed relation capable of withstanding the cutting forces generated by the tools 24 and 28. The chamfering tool 28 extends slidably through a square hole 36 extending vertically through the support portion 26, and a set screw 38 is provided to lock the chamfering tool at any desired vertical position in the hole 36. Another cutting tool 40 is shown mounted at another position on the square turret 14, and, when the square turret 14 is indexed to position tool 40 at the working position shown occupied by the tool holder 10 in FIG. 1, might be used to perform other turning operations on the workpiece 22 in the conventional manner normally carried out with square turrets.

Figure 2:
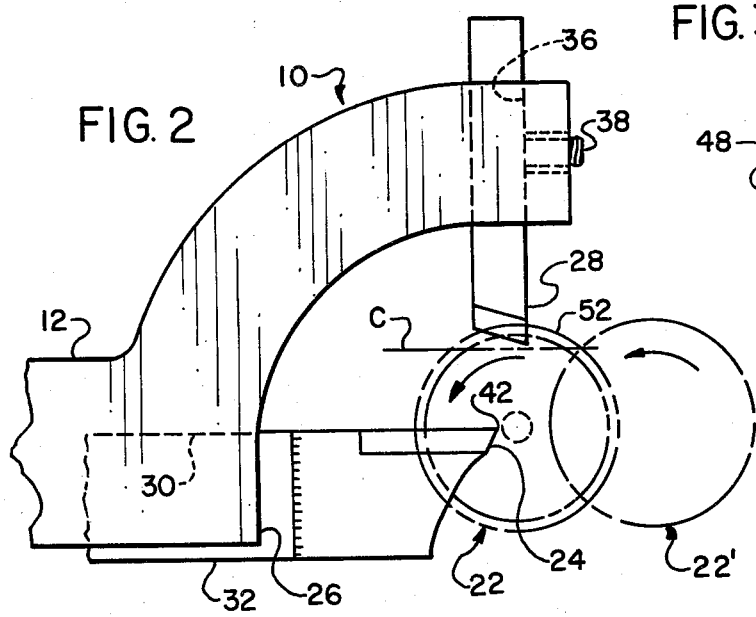
FIG. 2 is an elevational side view of the tool holder taken in the direction of the arrow 2 shown in FIG. 1.
Figure 3:
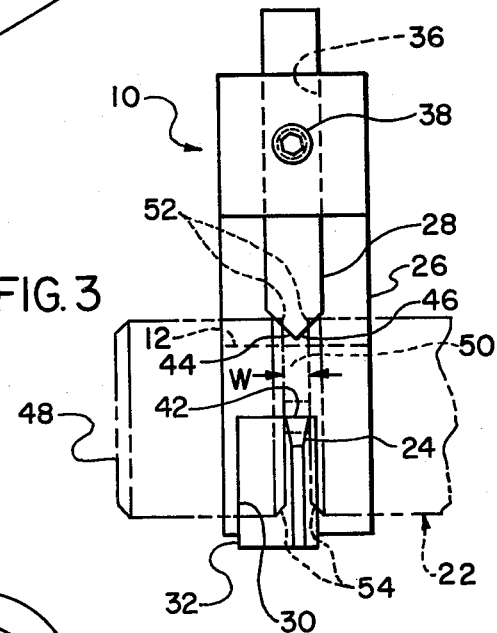
FIG. 3 is an elevational end view of the tool holder taken in the direction of the arrow 3 shown in FIG. 1.

The cutoff tool 24 has, at its extending end, the cutting edge 42 having a narrow predetermined width W. The cutting edge 42 extends generally parallel to the common rotational axis of the lathe spindle and the workpiece and is disposed at substantially the same vertical height as such axis, as best shown in FIG. 2. The chamfering tool 28 has at its extending end two chamferer edges 44 and 46, which intersect one another at 90° as shown in FIG. 3, and which are spaced generally vertically from the cutting edge 42 of the cutoff tool 24. As best shown in FIG. 3, the cutoff tool 24 and the chamfering tool 28 extend from holder 10 in a common vertical plane perpendicular to the common rotational axis of the lathe spindle, chuck, and workpiece, such common plane passing generally through the widthwise midportions of the tools 24 and 28.

As shown in FIG. 3, the cutting edge 42 of the cutoff tool 24 has a predetermined narrow width indicated by the letter W as described above, and the chamferer edges 44 and 46 of the chamfering tool 28 extend, respectively, outwardly beyond planes which pass through the ends of the cutting edge 42 and which extend parallel to the aforesaid common plane of tools 24 and 28, whereby the chamferer edges 44 and 46 will form chamfered edges on a groove cut by the cutoff tool 24 as will be explained below.

In use, the tool holder 10 of the present invention is mounted in the turret 14 as described above and as shown in FIG. 1, and the cross-slide 16 is moved to the left in FIG. 1 until any tool held in the turret 14 is clear of the work piece which is held by the collet to extend therefrom and rotate therewith. The turret 14 is then indexed to present the tool holder 10 at its operative position, the workpiece 22' shown in dotted lines in FIG. 2 representing the relative position of the workpiece to the tool holder prior to cutting and chamfering of the workpiece. The cross-slide 16 is then caused to move transversely toward the axis of the rotating workpiece 22, it being noted that the workpiece 22, at this point, has an extending portion 48 which extends beyond the tool holder 10 (see FIG. 3) so as to be engaged by the cutting tool 40 and the chamfering tool 28 as the aforesaid transverse movement of the cross-slide 16 continues. Initially, this transverse movement of the tool holder 10 advances the cutting edge 42 of the cutoff tool 24 into cutting engagement with the workpiece 22 substantially radially with respect to the rotational axis thereof, thereby cutting an annular groove 50 therein, the annular groove 50 having a width W and forming sharp peripheral edges 52 shown in dotted lines in FIG. 3. Since the chamfering tool 28 is also moving commonly with the tool holder 10 and cutting tool 24, the chamfering tool 28 simultaneously moves along a chordal path, indicated by reference character C in FIG. 2, with respect to the aforesaid peripheral edges 52 of the groove 50, and the relative positions of the cutting tool 24 and the chamfering tool 28 are such that the chamfering tool 28 will make contact with the peripheral edges 52 of the groove 50, as formed by the cutting tool 24, during the cutting of the groove 50.

In the preferred embodiment as illustrated, the chamfering tool is disposed and arranged in tracking relation to the cutoff tool so that the chamferer edges 44 and 46 first engage the peripheral edges 52 only after the cutoff tool has cut the annular groove 50 to a substantial depth. Therefore, the chamferer edges 44 and 46 will remove by their chordal cutting movement, only the outermost portions of the sides of the annular groove 50 to cut both chamfers 54 thereat. Also, the cutoff tool 24 is disposed somewhat behind the chamfering tool 28 so that as the radial cutoff tool movement continues to complete the cutting off of the end 48, the chamfering tool will pass over the rotational axis or center of the workpiece 22 to complete the chamfers 54 prior to completion of the cutting off of the extending end 48 by the cutting edge 42 reaching the center of the workpiece, or the breaking off of the end portion 48 of the workpiece before the cutting edge 42 reaches center.

Alternatively, the chamfering tool 28 may be set suitably ahead (not shown) of the cutoff tool 24 to cut a V-groove in the workpiece 22 before the cutoff tool 24 begins to cut the annular groove 50, and the residual portions of the V-groove cut at the periphery of the workpiece 22 would then form the chamfers for the annular groove 50 subsequently cut by the cutoff tool 24. Also, depending upon the desired configuration of the extending end portion 48, a chamfering tool having only a single chamferer edge, 44 or 46, might be used similarly, so that only one edge at the groove 50 would be chamferred (not shown). However, in these alternatives, the basic advantages of the tool holder 10 would still be evident in accomplishing cutoff and chamfer essentially simultaneously, without lost time or motion, and with certainty of getting the chamfering operation accomplished.

The particular embodiments disclosed in full detail herein and illustrated in the drawings have been provided for disclosure purposes only, are subject to variations for purposes such as adaptations to particular lathes or cutting tools, and are not intended to limit the scope of the present invention, which is to be determined by the scope of the appended claims.

I claim:

1. A tool holder having a mounting portion adapted to be mounted on the cross slide of a lathe that is arranged to turn a workpiece about a rotational axis, and a support portion having cutoff tool means mounted thereon to extend therefrom, said cutoff tool means presenting a cutting edge at the extending end thereof for cutting off a portion of said workpiece, and said support having chamfering tool means mounted thereon to extend therefrom substantially perpendicular to the extent of said cutoff tool means and fixed in a common plane therewith for presenting at least one chamferer cutting edge, said chamferer cutting edge of said chamfering tool means being disposed with respect to said cutting edge of said cutoff tool means for permitting tracking of said cutoff tool means by said chamfering tool means when said tool holder is disposed with said common plane perpendicular to said rotational axis of said lathe for cutting off and chamfering said workpiece adjacent said cutting off during a single transverse movement of said cross slide.

2. A tool holder according to claim 1 and characterized further in that said cutoff tool means is disposed behind said chamfering tool means relative to said transverse movement so that said chamfering means passes said workpiece rotational axis for completing said chamfering during said transverse movement prior to completion of said cutting off.

3. A tool holder according to claim 1 and characterized further in that said cutting edge of said cutoff tool means is straight and has a predetermined width, and in that said one chamferer cutting edge extends outwardly beyond a plane which is parallel to said common plane and which passes through one end of said straight cutting edge.

4. A tool holder according to claim 3 and characterized further in that said chamfering tool means has a second chamferer edge extending outwardly beyond a plane which is parallel to said common plane and which passes through the other end of said straight cutting edge.

5. A method of cutting off and chamfering a workpiece as it is turned in a lathe, said method comprising the steps of:
    (a) securing a workpiece to the spindle of said lathe for rotation therewith;
    (b) rotating said workpiece about an axis of rotation;
    (c) securing a cutoff tool and a chamfering tool fixedly to a cross-slide of said lathe;
    (d) moving said cutoff tool by means of said cross-slide substantially radially with respect to said axis of rotation of said workpiece and into cutting engagement with said workpiece to cut an annular groove therein;
    (e) moving said chamfering tool substantially chordally with respect to the peripheral edges of said workpiece adjacent said groove simultaneously and commonly with said cutoff tool movement by means of said cross-slide and into chamfer cutting engagement thereby with at least one of said edges; and
    (f) thereafter continuing said radially moving said cutoff tool for completion of said cutting off of said workpiece.

6. A method of cutting off and chamfering a workpiece according to claim 5 and characterized further in that said chamfer cutting engagement between said chamfering tool and said edge is completed prior to said completion of said cutting off of said workpiece.

7. In combination with a lathe having a rotating spindle with a workpiece extending therefrom and having a cross slide arranged for movement transverse to the rotational axis of said rotating workpiece, the improvement comprising a tool holder mounted on the cross slide of the lathe for movement therewith, cutoff tool means disposed on said holder for substantially radial movement with respect to said rotational axis of said workpiece for cutting off the extending end thereof, and chamfering tool means fixed on said holder in a common plane with said cutoff tool and arranged for substantially chordal movement with respect to a peripheral edge of the workpiece cut by said cutoff tool means for chamfering said edge, said radial movement and said chordal movement being simultaneously derived from said transverse movement of said cross slide with respect to said rotational axis of said workpiece.

8. A tool holder according to claim 7 and characterized further in that said chamfering tool means is disposed on said holder in relation to said cutoff tool means for completing said chamfer prior to completion of said cutting off of said extending end of said workpiece.

9. A tool holder according to claim 7 and characterized further in that said cutoff tool means cuts and annular groove in said workpiece and said chamfering tool means is arranged to chamfer simultaneously both peripheral edges of said groove cut by said cutoff tool.

* * * * *

UNITED STATES PATENT AND TRADEMARK OFFICE
CERTIFICATE OF CORRECTION

PATENT NO. : 4,223,576

DATED : September 23, 1980

INVENTOR(S) : James E. Donnelly

It is certified that error appears in the above—identified patent and that said Letters Patent is hereby corrected as shown below:

Column 5, line 24, after "support" insert -- portion --.

Column 6, line 52, "and" should read -- an --.

Signed and Sealed this

Fourth Day of August 1981

[SEAL]

Attest:

*Attesting Officer*

GERALD J. MOSSINGHOFF

*Commissioner of Patents and Trademarks*